United States Patent [19]

Muccitelli

[11] Patent Number: 4,728,497

[45] Date of Patent: Mar. 1, 1988

[54] USE OF AMINOPHENOL COMPOUNDS AS OXYGEN SCAVENGERS IN AN AQUEOUS MEDIUM

[75] Inventor: John A. Muccitelli, Feasterville, Pa.

[73] Assignee: Betz Laboratories, Inc., Trevose, Pa.

[21] Appl. No.: 216,392

[22] Filed: Dec. 15, 1980

[51] Int. Cl.[4] ............................................. C23F 11/06
[52] U.S. Cl. ...................... 422/16; 210/750; 252/188.28; 252/390; 252/392
[58] Field of Search .............. 210/749, 750, 757; 252/178, 392, 393, 403, 404, 188.28, 390; 422/16

[56] References Cited

U.S. PATENT DOCUMENTS

| | | | |
|---|---|---|---|
| 3,413,237 | 11/1968 | Foroulis | 252/393 |
| 3,728,281 | 4/1973 | Marks et al. | 252/392 |
| 3,843,547 | 10/1974 | Kaufman | 252/392 |
| 3,983,048 | 9/1976 | Schiessl | 252/178 |
| 4,012,195 | 3/1977 | Noack | 422/16 |
| 4,067,690 | 1/1978 | Cuisia et al. | 252/392 |
| 4,124,500 | 11/1978 | Arghiropoulis et al. | 210/757 |
| 4,278,635 | 7/1981 | Kerst | 210/750 |
| 4,279,767 | 7/1981 | Muccitelli | 210/749 |
| 4,282,111 | 8/1981 | Ciuba | 210/749 |

*Primary Examiner*—Barry S. Richman
*Assistant Examiner*—William R. Johnson
*Attorney, Agent, or Firm*—Alexander D. Ricci; Bruce E. Peacock

[57] ABSTRACT

A method for reducing the amount of oxygen in an oxygen-containing aqueous medium comprising adding to the medium an effective amount of a hydrazine-free aqueous solution of an aminophenol compound or acid salt thereof having the formula

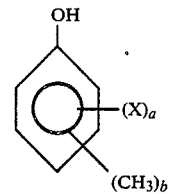

where
a=1, 2, or 3;
b is 0 or 1 and
x=amino or alkylamino (C1-C4).

22 Claims, No Drawings

USE OF AMINOPHENOL COMPOUNDS AS OXYGEN SCAVENGERS IN AN AQUEOUS MEDIUM

FIELD OF THE INVENTION

The present invention pertains to a method for reducing the dissolved oxygen content of aqueous mediums such as those existing in boilers and hot water heating systems.

BACKGROUND

From a corrosion point of view, the presence of dissolved gases, even in small amounts, is undesirable in water systems which contact metal surfaces. For example, metal surfaces in contact with oxygen-containing industrial water can experience severe pitting. Pitting is highly concentrated corrosion affecting only a small area of the total metal surfaces. This can, however, be a serious problem causing metal failure even though only a small amount of metal is lost and the overall corrosion rate is relatively low.

With respect to oxygen, the severity of attack will depend on the concentration of dissolved oxygen in the water, water pH and temperature. As water temperature increases, as for example in a water heating system, enough driving force is added to the corrosion reaction that small amounts of dissolved oxygen in the water can cause serious problems. Oxygen pitting is considered to be a most serious problem in boiler systems, even where only trace amounts of oxygen are present.

Deaeration is a widely used method for removing oxygen from an oxygen-containing aqueous medium. It is particularly useful for treating boiler feedwater and can be either mechanical or chemical.

While vacuum deaeration has proven to be a useful mechanical deaeration method for treating water distributing systems, boiler feedwater is treated using pressure deaeration with steam as the purge gas. According to the pressure deaeration method for preparing boiler feedwater, the water is sprayed into a steam atmosphere and is heated to a temperature at which the solubility of oxygen in the water is low. About 90 to 95 percent of the oxygen in the feedwater is released to the steam and is purged from the system by venting.

Mechanical deaeration is considered an important first step in removing dissolved oxygen from boiler feedwater. However, as already noted, as water temperature increases, even trace amounts of dissolved oxygen can cause serious problems. Accordingly, supplemental chemical deaeration is often required.

For boilers below 1000 pounds per square inch (psi), catalyzed sodium sulfite is used as an oxygen scavenger for the chemical deaeration of the feedwater. This chemical's oxygen scavenging property is illustrated by the reaction:

$$2Na_2SO_3 + O_2 = 2Na_2SO_4$$
Sodium + Oxygen = Sodium
Sulfite         Sulfate The oxygen-sulfite reaction can be effectively catalyzed by iron, copper, cobalt, nickel and/or manganese. While the sodium sulfite oxygen scavenger is often used with success, this material still has its limitations. At boiler operating pressures of 900 to 1000 psi and above, increased dissolved solids from the sulfite-oxygen reaction product can become a significant problem. Also, at high pressures the sulfite decomposes in the boiler to form sulfur dioxide and hydrogen sulfide, both of which can cause corrosion in the return condensate system.

Hydrazine is also used as an oxygen scavenger according to the reaction:

$$N_2H_4 + O_2 = 2H_2O + N_2$$
Hydrazine + Oxygen = Water + Nitrogen

This chemical does not have the above-noted high pressure limitations of sodium sulfite. For example, since the products of the hydrazine-oxygen reaction are water and nitrogen, no solids are added to the boiler water. Hydrazine as an oxygen scavenger does, however, have its own limitations. A major problem relates to its extreme toxicity and carcinogenicity. Also, the hydrazine-oxygen reaction is very slow at low temperatures which might be encountered such as at room temperature. Above 400° F., hydrazine also decomposes according to:

$$2N_2H_4 = N_2 + H_2 + 2NH_3$$
Hydrazine = Nitrogen + Hydrogen + Ammonia

The ammonia decomposition product can be aggressive to copper or the copper-bearing metallurgies that are found in condensate systems.

In an attempt to obviate some of the problems encountered by the use of hydrazine, it has been proposed to combine hydrazine with certain accelerator or catalyst compounds. For instance, U.S. Pat. Nos. 3,728,281 (Marko et al); 3,843,547 (Kaufman et al); 3,983,048 (Schiessl); and 4,124,500 (Arghiropoulos et al) all disclose that various aryl amine compounds may be added to the hydrazine solution. Other hydrazine additives are noted in U.S. Pat. Nos. 3,551,349 (Kallfass); and 4,012,195 (Noack).

Despite the efforts of the prior art, there remains a need for an oxygen scavenger or scavenger system which eliminates the use of hydrazine altogether while still effectively acting to remove or reduce dissolved oxygen from the desired aqueous medium.

DESCRIPTION OF THE INVENTION

The above and other objects are met by the use, in an oxygen containing aqueous medium, of an aminophenol compound of the formula:

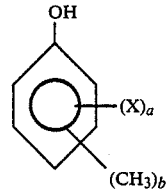

wherein
a=1, 2, or 3;
b=0 or 1; and
X is amino or lower alkyl amino ($C_1$-$C_4$).

It is contemplated that these compounds can be used either individually or as mixtures with each other within the aqueous system to be treated. The present invention is considered to be particularly useful for treating boiler feedwater and, accordingly, will be described in that environment. The above compounds are believed to be less toxic than hydrazine and are also characterized by the property of demonstrating significantly greater reactivity with oxygen at room temperature than hydrazine.

Representative compounds encompassed by the above formula include:
2,4-diaminophenol
5-methyl-o-aminophenol
o-aminophenol
p-aminophenol
3-methyl-p-aminophenol
4,6-diamino-2-methyl phenol
p-methylaminophenol
m-aminophenol
p-(N-methylamino)phenol
o-(N-butylamino)phenol Also, inorganic acid addition salts, such as the chloride and sulfate salts of the above compounds, are also mentioned as being useful. It is to be noted that the above listed compounds have been listed as being exemplary of various compounds which may be useful. This listing should not be construed as a limitation of the inventive idea herein disclosed. Any reference to "aminophenol" compounds herein is intended to refer to the above listed compounds (and inorganic acid addition salts thereof) as well as other compounds encompassed by the above formula.

The amount of compound added to the boiler feedwater (or any other aqueous medium containing dissolved oxygen) could vary over a wide range and would depend on such known factors as the nature and severity of the problem being treated. It is believed that the minimal amount of the aminophenol compound could be about 0.05 parts of active compound per million parts of the aqueous medium being treated. The preferred minimum is about 0.2 parts per million. It is believed that the maximum amount of aminophenol compound used could be as high as about 200 ppm, with about 35 parts per million being the preferred maximum. The preferred compound for usage is p-aminophenol.

The reactivity of the aminophenol compound with oxygen will depend on such factors as treatment concentration, water temperature and pH. In general aqueous systems where the treatment does not have the benefit of elevated water temperature, it is preferred that the water be of alkaline pH, e.g., greater than about 7.5. Otherwise, even though overfeeding the treatment may perform the necessary oxygen scavenging, economics would make such an approach undesirable. In treating boiler feedwater, is it preferred that once the water reaches the boiler proper it has an alkaline pH, which is always the case for boilers operating within ASME guidelines.

In treating boiler feedwater, it is a well known fact that oxygen can get into the boiler from other sources. Accordingly, in keeping with standard practices for treating boiler feedwater, an excess amount of oxygen scavenger should be used to provide a residual amount thereof in the boiler water for the uptake of oxygen from other sources. It is also contemplated that these materials could be used directly in the condensate system when condensed steam has experienced oxygen contamination.

PREFERRED EMBODIMENTS

The invention will now be further described with reference to the following examples and comparative examples. It is to be noted that the examples are to be regarded solely as illustrative and not as restricting the scope of the invention.

EXAMPLE I

In a first series of tests, the oxygen scavenging efficacies of various materials were evaluated under conditions of elevated temperature and pressure. The test apparatus used was essentially a stainless steel hot water flow system equipped with appropriate monitoring instrumentation. Demineralized feedwater, adjusted to the appropriate pH and initial dissolved oxygen level (controlled by nitrogen sparging), was pumped from a reservoir at ambient temperature into a once-through heater. Temperature was monitored continuously by means of thermocouples at several locations along the length of the flow tubing. A solution containing the oxygen scavenger test material was loaded into a pump driven syringe and fed continuously to the heated flow stream through a port containing a stainless steel ribbon mixing baffle. The feed-water contained dissolved oxygen and the test material then traversed the flow tubing via a by-pass comprising an additional length of coiled tubing. Contact (or reaction) time of the test material and dissolved oxygen were governed by the choice of coil length. The tendency of the temperature to drop during residence in the coiled tubing was offset by the use of thermostatted heating tapes which maintained the temperature in this tubing at 78±3° C. Upon exiting the coiled tubing, the stream flowed through a sample cooler to render the temperature of the liquid compatible with the operating range of a membrane-type dissolved oxygen probe. The cooled liquid was analyzed for dissolved oxygen via a D.O. flow cell, and pH was potentiometrically monitored in the flow tube immediately downstream of the D.O. probe. Outputs of the temperature, pH and dissolved oxygen probes during operation were monitored via strip chart recorders. The final destination of the reaction mixture was a reservoir which could be drained for analysis of reaction products, if desired.

A suitable set of operating conditions were found which were not extremely different from those experienced in boiler feedwater systems and which did not result in experimental uncertainties. A flow rate of 300 ml/min. through the apparatus was chosen, since this yielded the optimum response of the dissolved oxygen probe. Temperature in the system could be maintained at 78±3° C. under 4±1 psig. Residence time of the feedwater in the flow tube from the chemical feed point to D.O. flow cell outlet was 4±0.2 minutes. Approximately 3.5 minutes of this total was spent in a 40' length of 0.402 inch i.d. coiled tubing. Entry into and residence in the sample cooler accounted for 0.5 minutes of the total contact time.

According to an article by J. W. Cohn and R. E. Powell, Jr., J. American Chemical Society, 76,2568 (1954), hydrazine exhibits maximum oxygen scavenging efficacy in solution between pH 10.0–10.5. Accordingly, to provide a comparison of the aminophenol compounds with hydrazine the tests were performed with a pH which was substantially within that range.

The test solutions were prepared by initially mixing 10 grams of test material and 90 grams of demineralized water in glass bottles and allowing the mixture to remain in a shaker for several hours. If complete dissolution for a given material was observed after shaking, the pH of the solution was measured. When the pH of the solution was below 10.0, 7N sodium hydroxide was added dropwise until this value was reached. The quantity of added sodium hydroxide was recorded and later used in corrections for the active concentration of the solution. When the pH value of a stock solution was above pH 10.0 without requiring the addition of caustic, the solution was not further modified.

Results of these tests are reported in Table I below in terms of percent oxygen removed from the test stream. The precision of the initial and final dissolved oxygen values reported is approximately ±10%. Accordingly, values reported for percent oxygen removal which are below 20% may represent experimental artifacts. The experimental uncertainties decrease with increasing values of percent dissolved oxygen removal.

TABLE I

| Material | Dose (ppm) | Feedwater pH | Initial $O_2$ (ppm) | Final $O_2$ (ppb) | % $O_2$ Removal |
|---|---|---|---|---|---|
| Hydrazine | 96 | 10.3 | 1.8 | 160 | 91 |
| 2,4-Diaminophenol dihydrochloride | 76 | 10.4 | 1.6 | 14 | 99 |
| 5-Methyl-o-aminophenol | 96 | 10.8 | 2.0 | 13 | 99 |
| o-Aminophenol | 93 | 10.3 | 2.5 | 50 | 98 |
| p-Aminophenol | 83 | 10.4 | 1.6 | 32 | 98 |
| 3-Methyl-p-aminophenol | 68 | 10.8 | 2.2 | 160 | 93 |

This data indicates that the aminophenols are superior to hydrazine with respect to oxygen scavenging efficacy when tested under laboratory conditions similar to those encountered in boiler feedwater.

EXAMPLE 2

In order to compare the performance of certain of the aminophenol compounds with that of hydrazine under field-type conditions, a series of experiments were conducted on the feedwater of a working boiler. The test materials were fed to the deaerator storage tank (3-5 psig, 104° C.), and the resulting change, if any, in dissolved oxygen level was measured on a sample flowing from the feedwater line through a membrane-type dissolved oxygen probe.

The results of these tests are reported below in Table II in terms of % oxygen removed from the boiler feedwater.

TABLE II

| Material | Feedwater Dose (ppm) | Feedwater pH | Steam Load 1000#/hr. | Feedwater $O_2$ (ppb) Initial/Final | % $O_2$ Removed |
|---|---|---|---|---|---|
| 2,4-Diaminophenol dihydrochloride | 0.7 | 9.4 | 15 | 4.0/1.8 | 55 |
| Hydrazine | 1.1 | 9.4 | 15 | 4.0/2.0 | 50 |
| p-Aminophenol | 1.5 | 8.8 | 11 | 15.0/4.2 | 72 |
| Hydrazine | 1.6 | 8.8 | 11 | 13.0/4.0 | 69 |
| o-Aminophenol | 1.1 | 8.6 | 15 | 4.6/5.9 | 0 |
| o-Aminophenol | 19.0 | 9.0 | 18 | 5.5/0.3 | 95 |
| Hydrazine | 1.2 | 8.6 | 15 | 6.0/2.4 | 60 |

Upon examination of the data in Table II, the relatively wide range of experimental conditions encountered among the test parameters becomes readily apparent. Feedwater pH varied from 8.6 to 9.4, active feedwater concentrations of the test materials were between 0.7 and 19 ppm, steam production (feedwater flow) rates ranged between 11,000 and 18,000 lbs./hr. and initial dissolved oxygen levels in the absence of chemical feed ranged from 4.0 ppb to 18 ppb. These widely varying parameters reflect the difficulty of attempting to obtain precise data during experiments performed on a working boiler.

As Table II indicates, 2,4-diaminophenol dihydrochloride and p-aminophenol removed dissolved oxygen from boiler feedwater to an extent at least comparable to that effected by hydrazine under similar conditions. o-Aminophenol, however, required a much higher concentration under boiler feedwater conditions before its oxygen scavenger activity became evident. The greater sensitivity in detecting oxygen scavenging efficacy in experiments performed with the testing apparatus utilized in connection with Example I compared to those experiments carried out in the "working boiler" (Example 2) is believed to be the consequence of the metallurgical differences between the two systems (304 stainless steel Example 1 vs. mild steel Example 2).

While certain features of this invention have been described in detail with respect to various embodiments thereof, it will, of course, be apparent that other modifications can be made within the spirit and scope of the invention, and it is not intended to limit the invention to the exact details shown above except insofar as they are defined in the following claims.

The invention claimed is:

1. A method for reducing the amount of oxygen in an oxygen-containing aqueous medium comprising adding to said medium an effective amount of a hydrazine-free aqueous solution of an aminophenol compound or acid addition salt thereof having the formula:

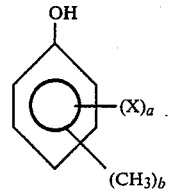

wherein
a=1, 2, or 3;
b is 0 or 1; and
X=amino or alkylamino wherein the alkyl group is $C_1$–$C_4$.

2. A method according to claim 1 wherein said aqueous medium is that of a water heating system.

3. A method according to claim 1 wherein said aminophenol compound comprises p-aminophenol.

4. A method according to claim 1 wherein said aminophenol compound comprises 2,4-diaminophenol dihydrochloride.

5. A method according to claim 1 wherein said aminophenol compound comprises 5-methyl-o-aminophenol.

6. A method according to claim 1 wherein said aminophenol compound comprises o-aminophenol.

7. A method according to claim 1 wherein said aminophenol compound comprises 3-methyl-p-aminophenol.

8. A method according to claim 1 wherein said aminophenol compound or acid addition salt thereof is added to said aqueous medium in an amount of about 0.05 to 200 parts per million parts of said aqueous medium.

9. A method according to claim 8 wherein said aminophenol compound or acid addition salt thereof is added to said aqueous medium in an amount of about 0.2 to 35 parts per million parts of said aqueous medium.

10. A method according to claim 1 wherein said aqueous medium is condensed steam in a boiler condensate system.

11. A method according to claim 10 wherein said aqueous medium has an alkaline pH.

12. A method for reducing the amount of oxygen in oxygen containing feedwater to a boiler comprising added to said feed-water an effective amount for the purpose of a hydrazine-free aqueous solution of an aminophenol compound or acid addition salt thereof having the formula:

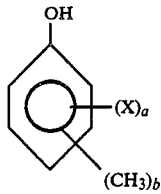

wherein
a = 1, 2, or 3;
b = 0 or 1; and
X = amino or alkylamino, wherein the alkyl group is $C_1$–$C_4$.

13. A method according to claim 12 wherein said aminophenol compound or acid addition salt thereof is added to said feedwater in an amount of about 0.05 to 200 parts per million parts of said feedwater.

14. A method according to claim 12 wherein said aminophenol compound or acid addition salt thereof is added to said feedwater in an amount of about 0.2 to 35 parts per million parts of said feedwater.

15. A method according to claim 12 wherein said aminophenol compound comprises p-aminophenol.

16. A method according to claim 12 wherein said aminophenol compound comprises 2,4-diaminophenol dihydrochloride.

17. A method according to claim 12 wherein said aminophenol compound comprises 5-methyl-o-aminophenol.

18. A method according to claim 12 wherein said aminophenol compound comprises o-aminophenol.

19. A method according to claim 12 wherein said aminophenol compound comprises 3-methyl-p-aminophenol.

20. A method for reducing the amount of oxygen in an oxygen-containing aqueous medium comprising adding to said medium an effective amount of a hydrazine-free aqueous solution of a compound selected from the group consisting of p-aminophenol; 2,4-diaminophenol dihydrochloride; 5-Methyl-o-aminophenol; o-aminophenol; 3-Methyl-p-aminophenol; and mixtures thereof.

21. A method for control of corrosion of metal surfaces in a boiler system caused by dissolved oxygen in the water, which comprises adding to the said system an effective amount of an aminophenol compound or acid addition salt thereof having the formula:

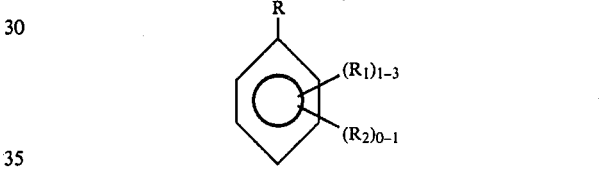

in which
R is OH, $R_1$ is amino or lower alkyl amino wherein the alkyl group is $C_1$–$C_4$, and
$R_2$ is methyl;
said aminophenol compound or acid addition salt thereof being the sole scavenger present.

22. The method according to claim 21 in which the pH of the water in the boiler system is maintained above 7.5.

* * * * *